United States Patent [19]

Takeshima

[11] Patent Number: 4,831,821
[45] Date of Patent: May 23, 1989

[54] SYSTEM FOR PURIFYING EXHAUST GAS FROM A DIESEL ENGINE

[75] Inventor: Shinichi Takeshima, Susono, Japan

[73] Assignee: Toyota Jidosha Kabushiki Kaisha, Japan

[21] Appl. No.: 52,419

[22] Filed: May 21, 1987

[30] Foreign Application Priority Data

Jun. 11, 1986 [JP] Japan .................................. 61-133787

[51] Int. Cl.⁴ ................................................ F01N 3/02
[52] U.S. Cl. ........................................ 60/286; 60/288
[58] Field of Search .................. 60/274, 285, 286, 288

[56] References Cited

U.S. PATENT DOCUMENTS

| | | | |
|---|---|---|---|
| 4,404,795 | 9/1983 | Oishi et al. ............................. | 60/274 |
| 4,604,868 | 8/1986 | Nomoto ................................. | 60/286 |
| 4,698,966 | 10/1987 | Distel ................................... | 60/286 |

FOREIGN PATENT DOCUMENTS

| | | | |
|---|---|---|---|
| 107810 | 6/1983 | Japan ..................................... | 60/286 |
| 104315 | 6/1983 | Japan ..................................... | 60/286 |
| 59-126018 | 7/1984 | Japan . | |
| 59-150917 | 8/1984 | Japan . | |

Primary Examiner—Douglas Hart
Attorney, Agent, or Firm—Oliff & Berridge

[57] ABSTRACT

A device for detecting a timing at which a refresh operation should be commenced for a filter for trapping particulates in exhaust gas in a diesel engine. The device calculates a trapping ratio by the filter from smoke density values at positions upstream and downstream of the filter, respectively. The smoke density at the position upstream of the filter is detected or is calculated from a data table in a memory. The detected trapping ratio is compared with a predetermined threshold value to determine whether it is time to commence a refresh operation for the filter. The threshold value is fixed or calculated from a data table in a memory.

7 Claims, 12 Drawing Sheets

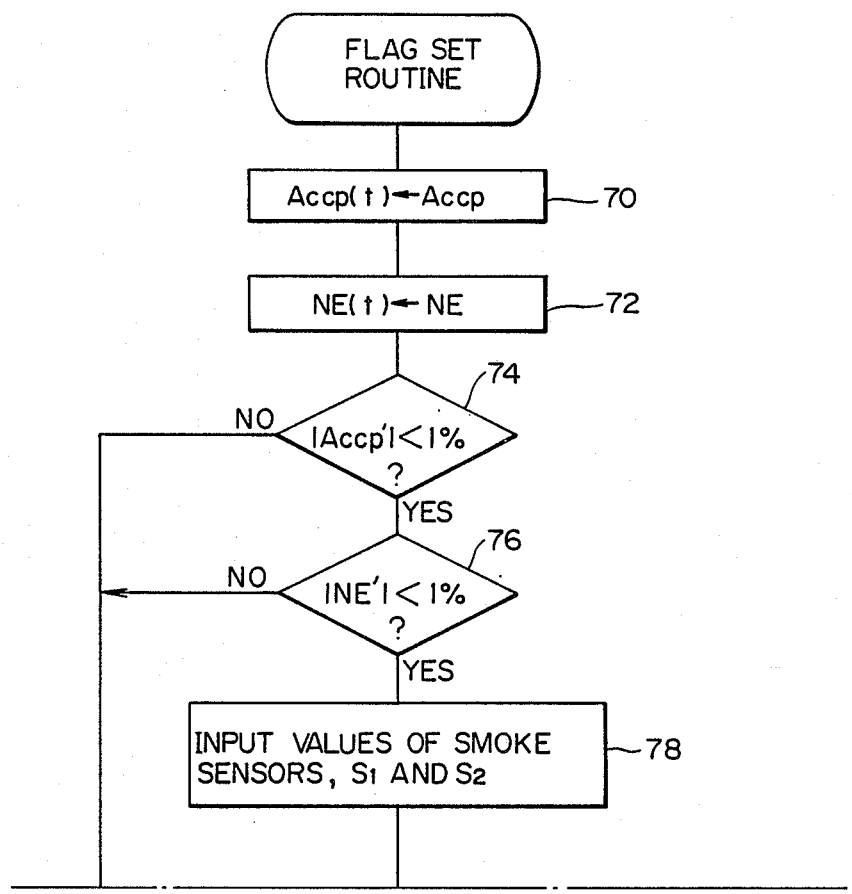

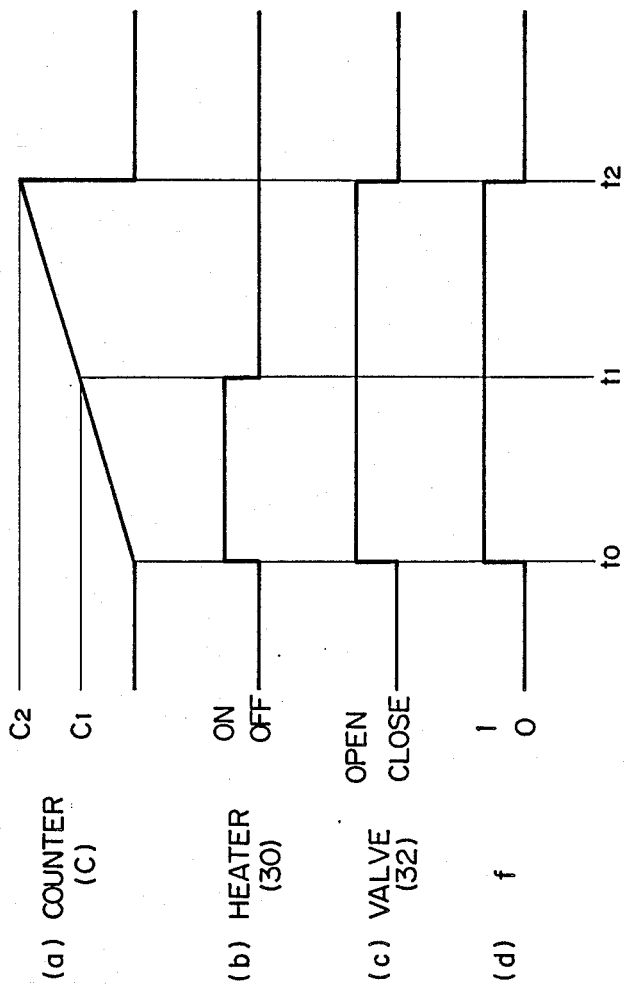

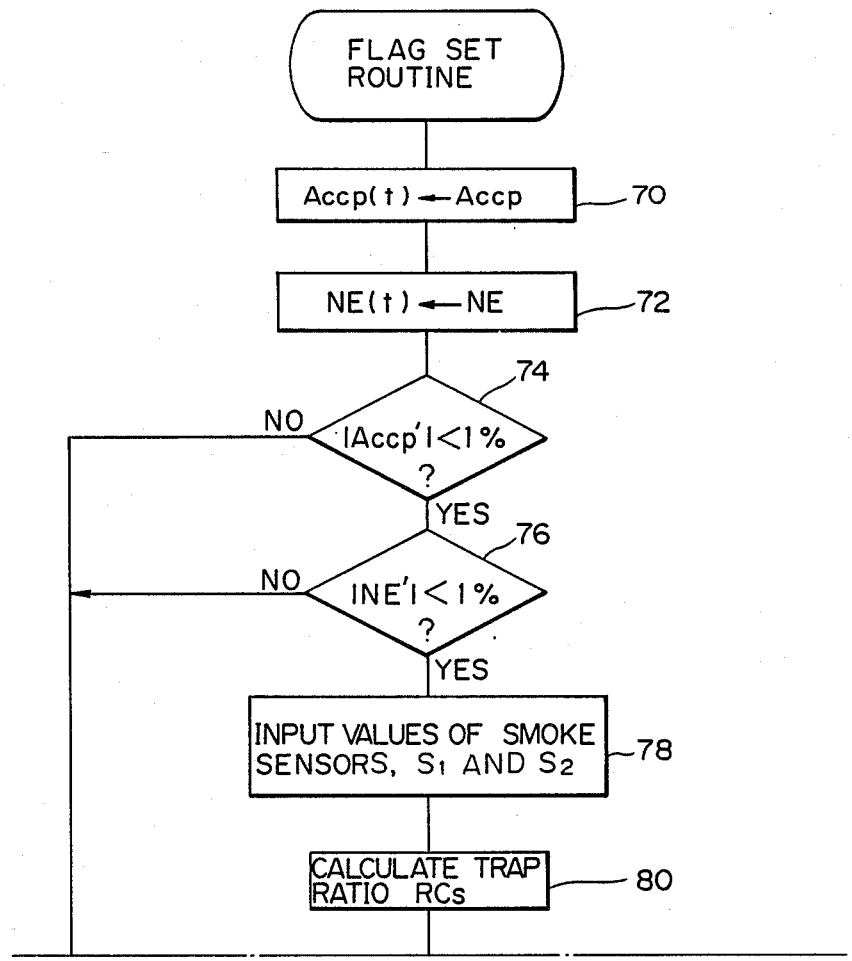

SYSTEM FOR PURIFYING EXHAUST GAS FROM A DIESEL ENGINE

BACKGROUND OF THE INVENTION

1. Field of the Invention

The present invention relates to a system for purifying an exhaust gas for a diesel engine, particularly to a system for trapping and incinerating particulates in the exhaust gas.

2. Description of the Related Art

Known in the prior art is a system for purifying particulates in an exhaust gas for a diesel engine provided with a filter arranged in an exhaust line of the engine. The particulates in the exhaust gas are caught and held by the filter.

Two types of filter are known. The first is a honeycomb type made of perforated ceramic material having a plurality of juxtaposed passageways having ends alternately plugged, wherein the exhaust gas is introduced into the passageways of the closed downstream end, passed through the wall thereof, and then discharged through the passageways of the closed upstream ends. The second is a foamed filter made of foamed ceramic material having a three-dimensional mesh construction. Irrespective of the type thereof, the filter is arranged in the casing connected to the exhaust pipe of the diesel engine, and a heater is arranged in the casing at a position near the inlet of the filter.

When a predetermined amount of particulates has accumulated in the filter, the heater is operated to ignite and incinerate the accumulated particulates, to refresh the filter. To detect the timing at which the refresh operation of the filter should be commenced, a system has been proposed in Japanese Unexamined Patent Publication (Kokai) No. 59-126018, wherein a value of a pressure difference across the filter is detected. The determination of the timing at which the refresh operation should be commenced is effected by determining whether the pressure difference is larger than a predetermined value. When the pressure difference becomes larger than the predetermined difference value, the heater is operated to start the refresh operation of the filter.

The detection of the pressure difference across the filter is suitable for the above mentioned honey-comb type filter for determining a correct timing for commencing the refresh operation of the filter. In this type of the filter, the exhaust gas is introduced to an upstream end of each passageway having a closed downstream end, and is discharged via a downstream end of each passageway having a closed upstream end. This type of filter also has a plurality of fine voids in the walls between the passageways, through which voids the exhaust gas is passed. When the exhaust gas is passed through the voids, the particulates are deposited on the surface of the walls and thus do not pass therethrough. When the amount of the deposited particulates is increased, the pressure difference across the filter is also naturally increased. Therefore, the value of the pressure difference across the filter corresponds precisely to the amount of particulates trapped by the filter.

When the above mentioned foamed type filter is employed, the pressure difference does not always precisely indicate the amount of trapped particulates. This type of filter has the three-dimensional mesh construction, and has voids having a diameter which is larger than that of the voids in the honey-comb type filter. From the dimensional viewpoint, the particulates can easily pass through the filter, but in this type of filter, when the exhaust gas is passed through the three-dimensional mesh construction, the particulates come into contact with the inner surface of the mesh construction, and are "adsorbed" thereon. This trapping of the particulates by adsorption on the surface of the three-dimensional mesh structure in the foamed type filter has a lower trapping efficiency and there is little or no pressure drop across the filter. Accordingly, in the foam type filter, the pressure difference across the filter does not always directly correspond to the amount of trapped particulates, and as a result, a detection of the timing of the refresh operation of the filter is sometimes imprecise and unsatisfactory.

In a known prior art system provided with a smoke density sensor, the timing for a refresh operation of a filter is detected by judging whether an accumulated value of the smoke density has reached a predetermined value. (See Japanese Unexamined Patent Publication (Kokai) No. 59-150917.) The accumulated value of the smoke density in this prior art can not detect a correct timing for the refresh operation of the filter, since the trapping ratio itself changes when the amount of particulates held in the filter is varied.

In this prior art, the value of the smoke density is accumulated when the filter is refreshed by itself. Thus, the refresh operation is prematurely commenced while the filter can still trap a substantial amount of particulates.

SUMMARY OF THE INVENTION

An object of the present invention to provide a system capable of detecting a precise timing at which a refresh operation of a foam type filter should be commenced.

According to the present invention, a system is provided for purifying particulates in exhaust gas for a diesel engine having an exhaust line for discharging the exhaust gas. This system comprises: filter means arranged in the exhaust line for trapping particulates in the exhaust gas by adsorption; means for detecting a trapping ratio of the particulates in the exhaust gas at the filter means; means for detecting a timing for a refresh operation of the filter means from the detected trapping ratio; and means for commencing the refresh operation when that timing is detected so as to incinerate the particulates held in the filter.

Therefore, according to the construction of this invention, a timely commencement of the refresh operation of the filter can be attained by detecting a trapping ratio.

Further, according to this invention, the timing is correctly detected irrespective of a self-refresh operation, since a trapping ratio is detected, and thus a timely refresh operation can be always attained.

BRIEF DESCRIPTION OF THE DRAWINGS

FIGS. 2A, 2B and 3 are flow charts indicating the operations of a control circuit in FIG. 1;

FIG. 5 shows timing charts illustrating the operation of the system of the first embodiment of the present invention;

FIGS. 9A and 9B show a flow chart of a refresh operation in a third embodiment of the present invention; and, FIG. 10 shows maps in a memory of threshold values of a trapping ratio for commencing a refresh operation with respect to combinations of engine speed and the degree of depression of the accelerator.

DESCRIPTION OF THE PREFERRED EMBODIMENTS

Figure 1:
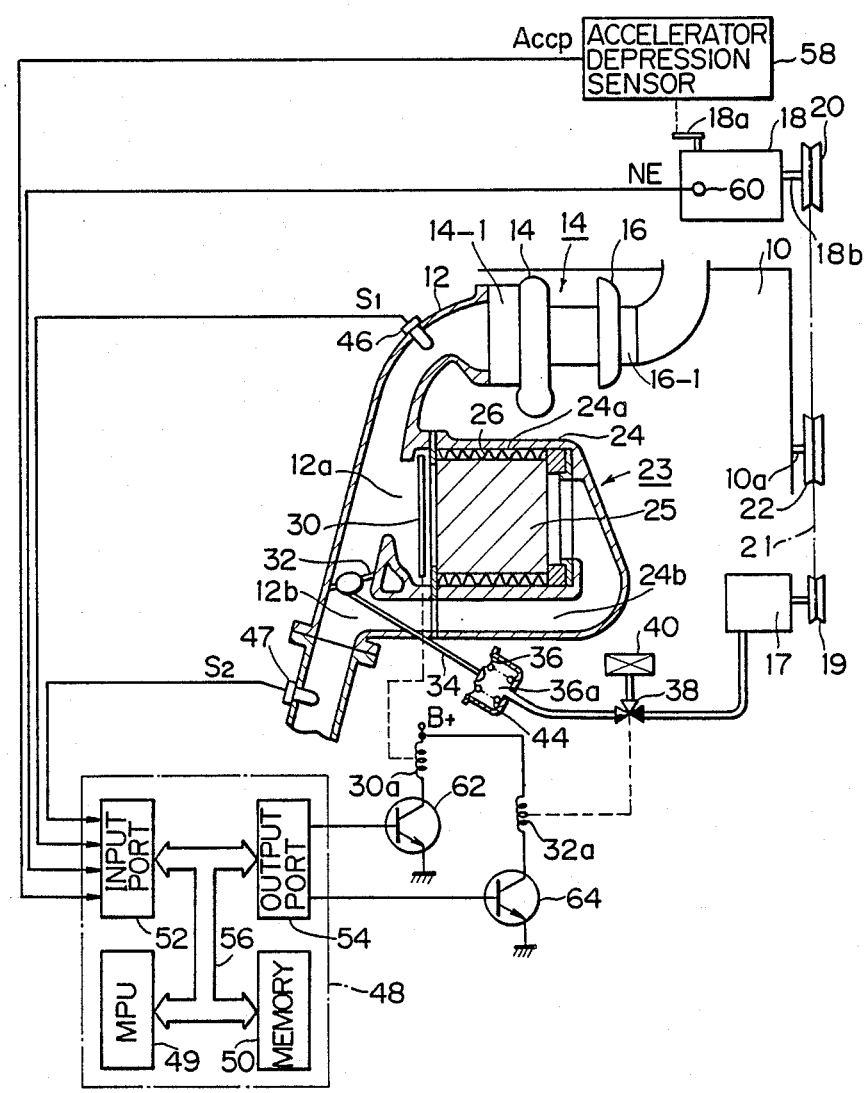
FIG. 1 generally and diagrammatically shows a construction of a system according to the present invention.

In FIG. 1, 10 designates a body of a diesel engine, to which an exhaust pipe 12 is connected for receiving exhaust gas from the engine body 10. Numeral 14 designates a turbocharger provided with a turbine unit 14 and a compressor unit 16. The turbine unit 14 has an inlet (not shown) connected to an exhaust manifold (not shown) of the engine, and an outlet 14-1 connected to the exhaust pipe 12, and the compressor unit 16 has an inlet 16-1 connected to an air cleaner (not shown) for the introduction of air and an outlet (not shown) connected to an intake manifold (not shown) of the engine body 10. A vacuum pump 17 and a fuel injection pump 18 are provided with pulleys 19 and 20, respectively, which pulleys are kinematically connected, via a belt 21, to a pulley 22 on the crankshaft 10a of the engine body 10, so that the vacuum pump 17 and the fuel injection pumps 18 are operated by the rotation of the crankshaft 10a.

Numeral 23 generally designates a trapping device for trapping particulates in the exhaust gas from the diesel engine and for incinerating the particulates held therein. The trapping device 23 includes, as basic elements, a housing 24 and a filter 25 arranged therein. The filter 25 has a foamed construction made of a ceramic material. To obtain such a foamed type filter, as is well known, first a foamed polymeric material is formed in a predetermined shape, then a ceramic material is doped to the shaped polymeric material, and finally, the polymeric material component is thermally eliminated or burnt so that a ceramic component having a three-dimensional void structure is left.

The exhaust pipe 12 has an exhaust gas diverging port 12a formed in a wall thereof, and an exhaust gas re-introducing port 12b located downstream of the diverging port 12a in the direction of flow of the exhaust gas. The housing 23 has a tubular bore 24a in which the filter 25 is inserted, and a bent passageway 24b located downstream of the filter 25 in the direction of flow of the exhaust gas. When the housing 24 is connected to the exhaust pipe 12 the upstream end of the filter 25 is communicated with the exhaust gas diverging port 12a, and downstream end of the passageway 24b is communicated with the exhaust gas re-introducing port 12b.

During normal operation of the trapping system of the present invention, the by-pass valve 32 is closed. Accordingly, exhaust gas is directed to the filter 25 having the above mentioned three-dimensional mesh construction. When the exhaust gas is passed through the filter 25, the particulates in the exhaust gas come into contact with the three-dimensional mesh structure, and are then absorbed on the inner surface of the mesh structure. The efficiency of the adsorption of the particulates is soon decreased, since there is no room on the surface to allow the particulates to be adsorbed. Therefore, a refresh operation of the filter becomes necessary.

The system for refreshing the filter 25 includes, basically, an electric heater 30 arranged in front of the filter 25 and a by-pass control valve 32 arranged in the exhaust pipe 12 at a location between the driverging port 12a and re-introducing port 12b. A vacuum operated actuator is provided for operating the by-pass control valve 32. The actuator includes a diaphragm 36, a rod 34 for connecting the diaphragm 36 with the by-pass control valve 32, and a spring 44 for urging the diaphragm 36 so that the by-pass control valve 32 is normally closed, as shown, so that all of the exhaust gas from the diesel engine 10 is introduced into the filter 25 via the diverging port 12a. Formed on the side of the diaphragm 36 opposite to the rod 34 is a chamber 36a. An electro-magnetic three-way switching valve 38 is provided to selectively connect the chamber 36a to the vacuum pump 17 or an air filter 40. When the three-way valve 38 is de-energized, the chamber 36a is connected to the air filter 40, so that the chamber 36a is under a pressure equal to the atmospheric air pressure, and thus the spring 44 urges the diaphragm 36 to close the by-pass control valve 32. When the three-way valve 38 is energized, the chamber 36a is connected to the vacuum pump 17, so that the chamber 36a is under a vacuum pressure, and thus the diaphragm 36 is moved against the force of the spring 44, permitting the valve member 32 to open and allow most of the exhaust gas to pass through the exhaust pipe 12 without being substantially directed to the filter 25.

According to the present invention, the system is provided with a means for detecting a trapping ratio, which corresponds to a ratio of the amount of particulates trapped by the filter 25 to the total amount of the particulates included in the exhaust gas during a predetermined time. Thus, the trapping ratio indicates the remaining ability of the filter 25 for trapping the particulates. In this embodiment, the means is comprised essentially by smoke density sensors 46 and 47 arranged upstream and downstream, respectively, of the by-pass control valve 32. Various types of smoke density sensors are known, such as those for detecting an electric resistance or detecting the amount of light passing the sensor, the value of which resistance or amount changing in accordance with changes in smoke density, and any of the known types of smoke density sensors can be employed in the present invention.

A control circuit 48 as a micro computer system is provided for controlling the refresh operation of the filter 25 by the electric heater 30 and the by-pass control valve 32. The control circuit 48 is provided with a micro-processing unit (MPU) 49, a memory 50, an input port 52, an output port 54, and a bus 56 interconnecting these units 49, 50, and 52. The smoke density sensors 46 and 48, and other various sensors are connected to the input port 54 for inputting information determining the point at which the filter needs refreshing. Among these sensors, 58 indicates a sensor for providing an electric signal Accp indicating the degree of depression of an accelerator pedal (not shown), for ddtecting an angular position of an adjusting lever 18a of the fuel injection pump 18. As is well known to those skilled in this art, the adjusting lever 18a is connected to the accelerator pedal for controlling the amount of fuel to be injected. An engine speed sensor 60 is provided in the fuel injection pump 18 and issues an electric signal indicating the rotational speed of the shaft 18b of the fuel injection pump 18, which corresponds to an engine speed NE.

The output port 54 is connected to a transistor 62 which selectively energizes a relay coil 30a for operating the heater 30, and to a transistor 64 which selectively energizes a relay coil 32a for operating the solenoid of the three-way switching valve 38.

The control circuit 48 carries out the refresh operation of the filter 25 when the trapping ratio as detected in accordance with the present invention becomes smaller than a predetermined value. The memory 50 is provided with programs and data for attaining this operation. The operation of the control circuit 48 will now be described with reference to flow charts shown in FIGS. 2 and 3.

Figure 2B:
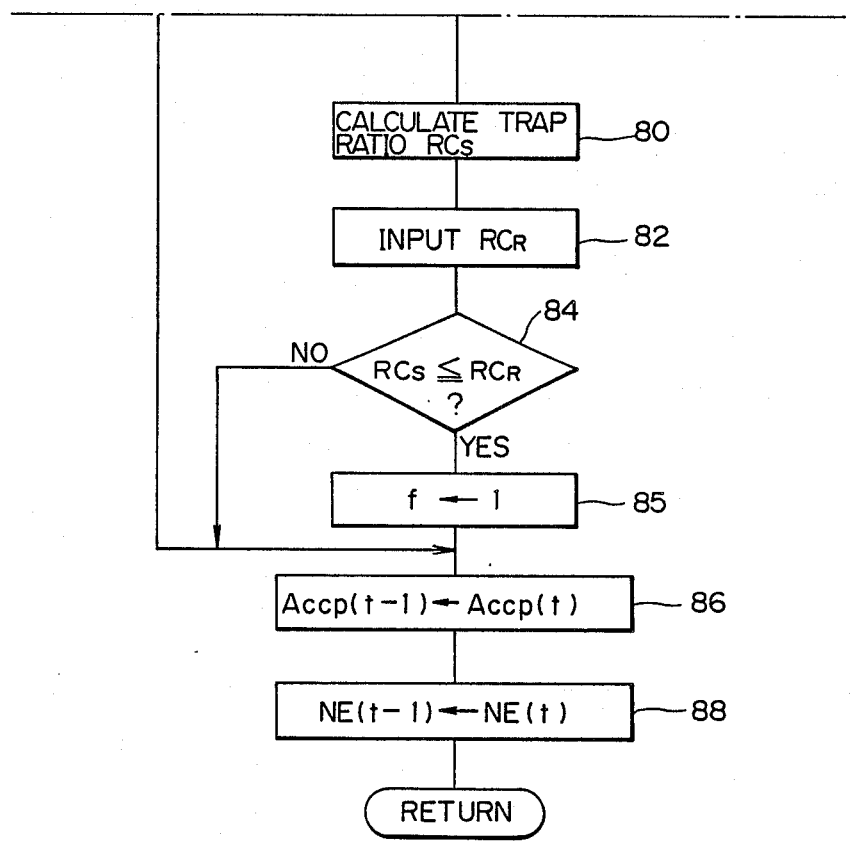

FIG. 2 is a flow chart of a routine for controlling a flag for commencing the refresh operation of the filter 25. This routine is entered into execution at a predetermined short time interval, such as 50 ms. At point 70, the value of the signal of accelerator position sensor 58 for detecting the degree of depression of the accelerator pedal Accp is moved to a box Accp(t) for storing the value of the degree of the depression of the accelerator pedal in this cycle. At point 72, the engine speed NE detected by the engine speed sensor 60 is moved to a box NE(t) for storing the engine speed in this cycle.

At point 74, it is determined whether the absolute value of the rate of change in the degree of depression of the accelerator pedal Accp' is smaller than a small value, for example; 1%. Accp' is calculated by the following equation.

$$Accp' = (Accp(t) - Accp(t-1))/(Accp(t-1))$$

where $Accp(t-1)$ indicates the value of the degree of depression of the accelerator pedal obtained at the preceding cycle. At point 76, it is determined whether the absolute value of the rate of change in the engine speed NE' is smaller than a small value, for example, 1%. NE' is calculated by the following equation.

$$NE' = (NE(t) - NE(t-1))/(NE(t-1))$$

where $NE(t-1)$ indicates the value of the engine speed obtained at the preceding cycle. When the engine is in a transient state other than the steady state, the absolute value of the rate of change in the degree of depression of the accelerator pedal Accp' is larger than 1% and/or the absolute value of the rate of change in the engine speed NE' is larger than 1%, and the routine by-passes the following steps 78 and 85 for detection of the timing of the operation for a refresh of the filter. When the engine is in the transient state, the smoke density is easily changed. Furthermore, sometimes a correct detection of the smoke density can not be carried out, because particulates once held by the filter are again detached therefrom. This reduces the precision of the detection of the timing of the operation for a refresh of the filter, and therefore, the routines 78 to 85 are by-passed.

When the engine is in a steady state, the absolute value of the rate of change in the degree of depression of the accelerator pedal Accp' is smaller than 1%, and the absolute value of the rate of change in the engine speed NE' is smaller than 1%, and thus the routine goes from points 74 and 76 to point 78, where the values of the smoke density $S_1$ and $S_2$ detected by the smoke density sensors 46 and 47 are input.

At point 80, the trapping ratio $RC_S$ is calculated, which is defined by the ratio of the change of the smoke density when the gas is passed through the filter 25, $(S_1 - S_2)$ to the smoke density $S_1$ of the gas before entering the filter 25. Therefore, the trapping ratio is obtained by the following equation.

$$RC_S = (S_1 - S_2)/S_1$$

Figure 4:
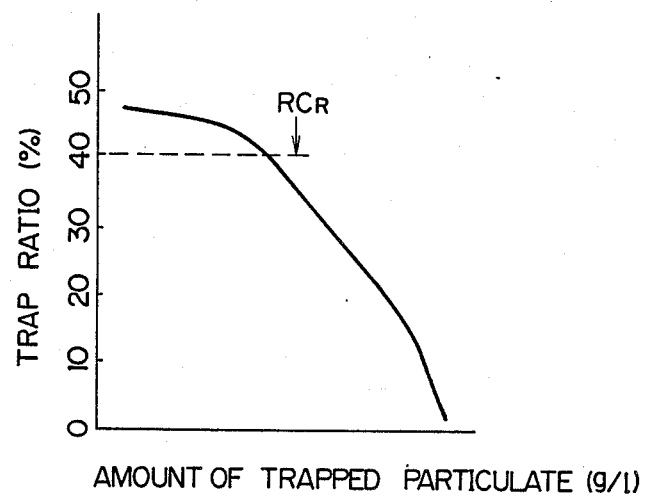
FIG. 4 is a graph indicating a relationship between an amount of trapped particulates and a trapping ratio.

At point 82, a predetermined threshold value $RC_R$ of the trapping ratio, $RC_S$ for commencing the refresh of the filter 25 is input. FIG. 4 shows a relationship between the amount of particulates trapped by the filter 25 and the value of the trapping ratio $RC_S$. It is clear from FIG. 4 that there is a trapping ratio value below which the amount of trapped particulates is sharply decreased. Therefore, a threshold level $RC_R$ for determining the point at which the operation for a refresh of the filter should be carried out is selected to be near that value.

At point 84, it is determined whether the actual value of the trapping ratio $RC_S$ as calculated at point 80 is larger than the predetermined threshold value $RC_R$ input at point 82. A "NO" result at point 84 means that a refresh of the filter 25 is still not necessary, and the routine by-passes point 85. Conversely a "YES" result at point 84 means that a refresh of the filter 25 is now necessary, and the routine goes to point 85, where the refresh flag f is set to "1". This flag is used for starting the refresh operation of the filter 25 as realized in the routine in FIG. 3.

At point 86, the value of the degree of the depression of the accelerator pedal Accp(t) of this cycle is moved to $Accp(t-1)$ for use in the following cycle, and at point 88, the value of the engine speed NE(t) of this cycle is moved to $NE(t-1)$ for use in the following cycle.

Figure 3:
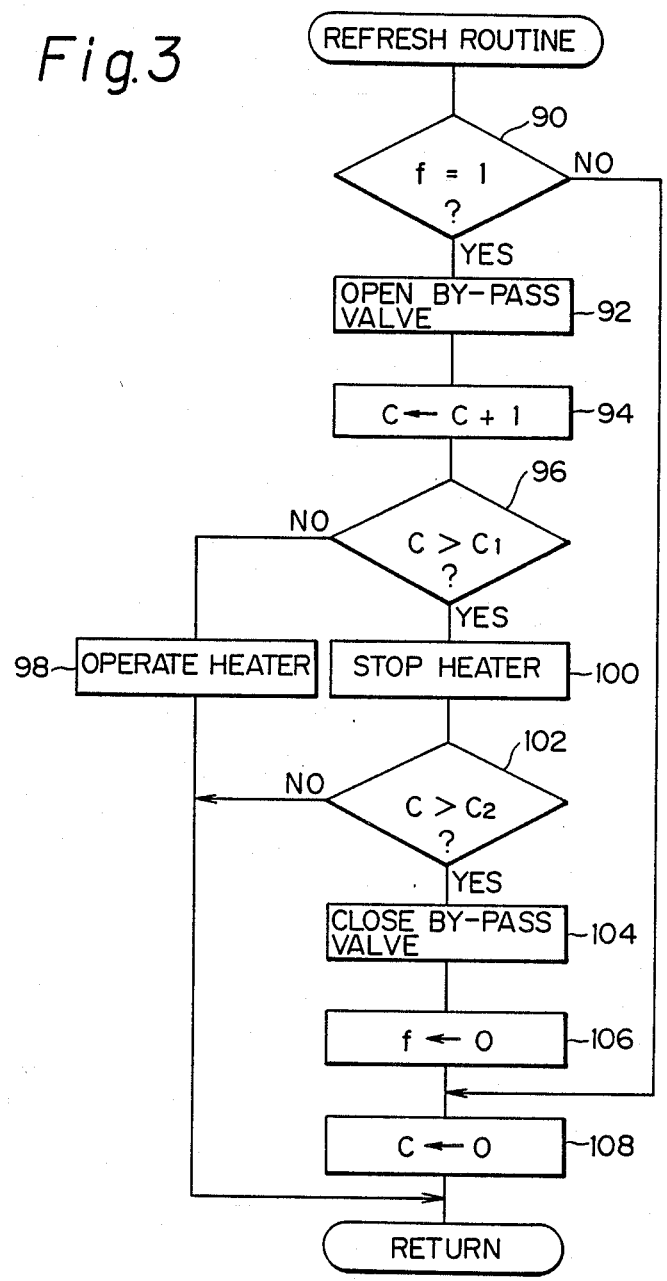

FIG. 3 is a flow chart of a routine for executing a refresh of the filter 25, which routine also can be executed at a predetermined time interval. At point 90, it is determined whether the flag f is set. When the filter must be refreshed, the flag has a value of "1", and the routine then goes to point 92, where a signal is issued from the outlet port 54 to turn ON the transistor 64. Thus, the relay coil 32a is energized, and the switching valve 38 assumes the position at which the chamber 36a is connected to the vacuum pump 17. The chamber 36a is under a vacuum pressure, and thus the diaphragm 36 is moved against the force of the spring 44 to open the by-pass control valve 32. Thus, most of the exhaust gas from the internal combustion engine is sent directly through the exhaust pipe without being substantially directed to the filter 25.

At point 94, a counter c is incremented. This counter c measures the duration of a time from the beginning of the refresh operation of the filter, and at point 96, it is determined whether the value of the counter c is larger than a predetermined value $c_1$. This predetermined value corresponds to a period for operating the heater 30, which is determined in accordance with a minimum time period of, for example, 30 seconds, necessary to ignite the particulates held by the filter 25. At the initial stage of the refresh operation, c is smaller than $c_1$, and the routine goes to point 98, where a signal is issued from the outlet port 54 to turn the transistor 62 ON. Thus, the relay coil 30a is energized and the heater 30 is energized.

After the completion of the ignition of the particulates held in the filter, the result at point 96 is "Yes" because $c > c_1$, and the routine then goes to point 100, where a signal is issued from the outlet port 54 to turn the transistor 62 OFF. Thus, the relay coil 30a is de-energized, and the heater 30 is also de-energized.

At point 102, it is determined whether the value of the counter c is larger than a predetermined value $c_2$, corresponding to a time period of, for example, one minute, needed for a complete incineration of the particulates held in the filter 25. When the incineration of the particulates is not complete, the routine by-passes steps 104 to 108. When the incineration of the particulates held in the filter 25 is complete, the value of the counter c is larger than the predetermined value $c_2$. The routine then goes to point 104, where a signal is issued from the output port 54 to turn the transistor 64 OFF. Thus, the relay coil 32a is deenergized, and the switching valve 38 takes a position in which a connection is made between the chamber 36a of the actuator and the air filter 40. Thus, the chamber 36a is under the atmospheric pressure, causing the spring 44 to urge the diaphragm so that the by-pass control valve 32 is in the normally closed position, and accordingly, a flow of exhaust gas directed to the filter 25 is again established.

At point 106, the flag f is reset to "0", and at point 108, the counter c is cleared to "0" in preparation for the following refresh operation.

FIG. 5 shows timing charts indicating the condition of main units in the system of FIG. 1, that is, the counter c, heater 30, valve 32, and flag f. At time $t_0$ (counter=0), the heater 30 is made ON and the valve 32 opens to commence the refresh operation. At time $t_1$ (counter=$c_1$), the heater 30 is made OFF. Then, at time $t_2$ (counter=$c_2$) the valve 32 is closed, stopping the refresh operation.

Figure 6A:
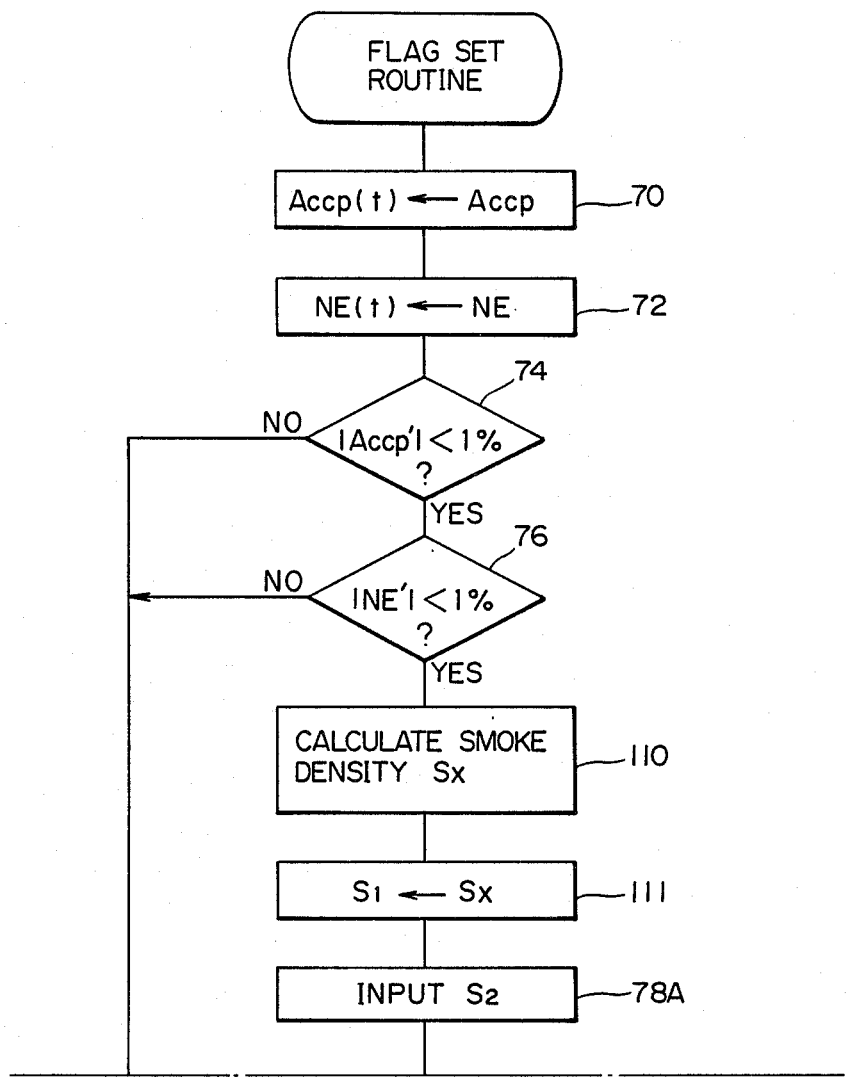
FIGS. 6A and 6B show a flow chart of a refresh operation in a second embodiment of the present invention.
Figure 6B:
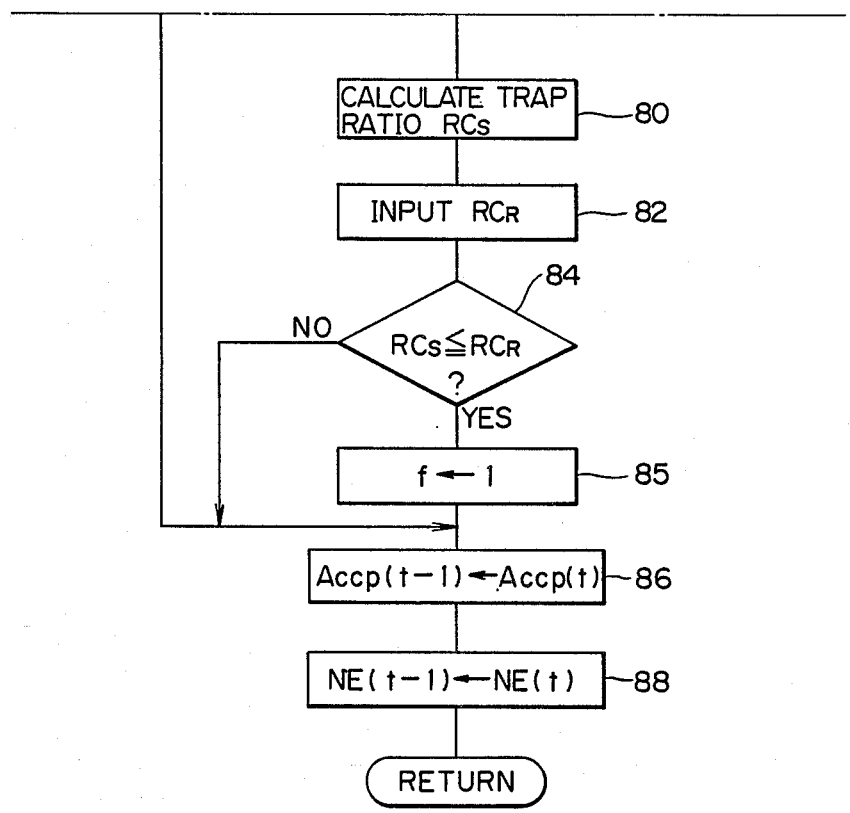

In the second embodiment of the present invention, in FIG. 1, only the second smoke density sensor 47 downstream of the filter 25 is provided. That is, the first smoke density sensor 46 upstream of the filter 25 is omitted. Namely, instead of actually sensing the smoke density upstream of the filter 25, this density is calculated from data stored in the memory 50. The smoke density at the position upstream of the filter 25 is substantially not affected by the change in the deposited condition of the filter 25 and is mainly determined by engine operating conditions such as engine speed and load. Therefore, in this embodiment, smoke density data is stored in the memory, and during the actual operation of the engine, the smoke density upstream of the filter is calculated in accordance with the engine conditions. FIG. 6 is a flow chart of a flag set routine in the second embodiment, using the data map. The routine executed in FIG. 6 differs from that in FIG. 2 only in that steps 110 and 111 are inserted between steps 76 and 78, and step 78 in FIG. 2 is modified to step 78A. Therefore, only the different points are explained. At point 110 in FIG. 6, the upstream smoke density $S_X$ is calculated. As mentioned above, the smoke density in the exhaust gas is substantially determined by the engine speed and load. The memory 50 is provided with a two dimensional array comprised by an engine speed and load, which is represented by, for example, a degree of depression of the accelerator pedal. At each of the points determined by the engine speed and load, a smoke density value is stored. Four points adjacent to the prevailing speed and load are determined, and the value of the smoke density corresponding to the prevailing speed and load $S_X$ is calculated by a well known interpolation method. At point 111, the value of the thuscalculated $S_X$ is moved to $S_1$. At point 78A, the value of the smoke density $S_2$ detected by the smoke density sensor 47 at the position downstream of the filter is input. The remaining steps are the same as those explained with reference to FIG. 2, and therefore, an explanation thereof is omitted.

The second embodiment has an advantage of a lower cost, compared with the first embodiment, since only one smoke density sensor 47 is necessary.

Figure 8:
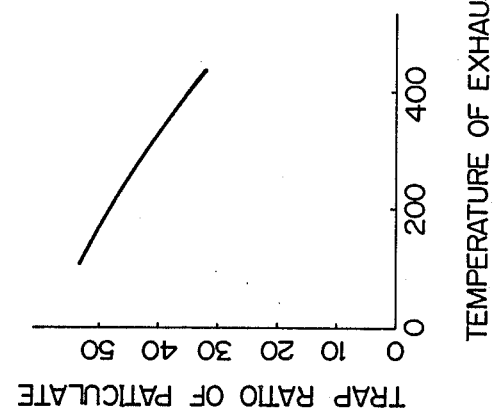
FIG. 8 is a graph indicating a relationship between the temperature of the exhaust gas and a trapping ratio.
Figure 7:
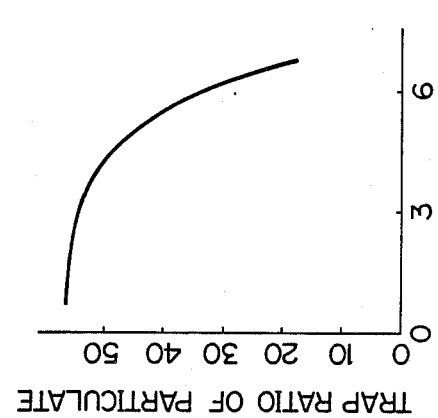
FIG. 7 is a graph indicating a relationship between the speed of an exhaust gas and a trapping ratio.

In the third embodiment, the threshold value $RC_R$ of the trapping ratio $RC_S$ for commencing the refresh operation of the filter is calculated in accordance with the engine operating conditions. FIG. 7 shows a relationship between the speed of the exhaust gas and the trapping ratio of the particulates by the filter. FIG. 8 shows a relationship between the temperature of the exhaust gas and the trapping ratio of the particulates by the filter. As will be clear, the faster the flow speed of the exhaust gas or the higher the temperature of the exhaust gas, the lower the trapping ratio of the particulates. This means that a change in the gas speed or the exhaust gas temperature due to a change in the engine operating condition allows the trapping ratio to be changed accordingly. In this third embodiment, instead of detecting the exhaust gas flow rate or the exhaust gas temperature, the engine speed and the degree of depression of the accelerator pedal as an engine load, corresponding to the exhaust gas flow rate and the exhaust gas temperature, are detected to determine the threshold value $RC_R$ of the trapping ratio $RC_S$ for commencing the refresh operation of the filter. In other words, when the engine speed and the degree of depression of the accelerator depression are known, the exhaust gas flow rate and the exhaust gas temperature are substantially automatically determined. Therefore, it is possible, as seen from FIGS. 7 and 8, to determine the threshold value $RC_R$ of the trapping ratio $RC_S$ at a given engine speed and degree of accelerator depression. The memory 50 is provided with a two-dimensional array comprised by an engine speed and a degree of depression of the accelerator pedal. At each point at which a combination of the engine speed and the degree of the accelerator depression is determined, a threshold value $RC_R$ of the trapping ratio $RC_S$ is stored in the memory. A value of the actual threshold level $RC_R$ of the trapping ratio $RC_S$ is calculated from the map by using the interpolation method. This calculated threshold value is used to determine the timing at which the refresh operation of the filter should be commenced.

Figure 9B:
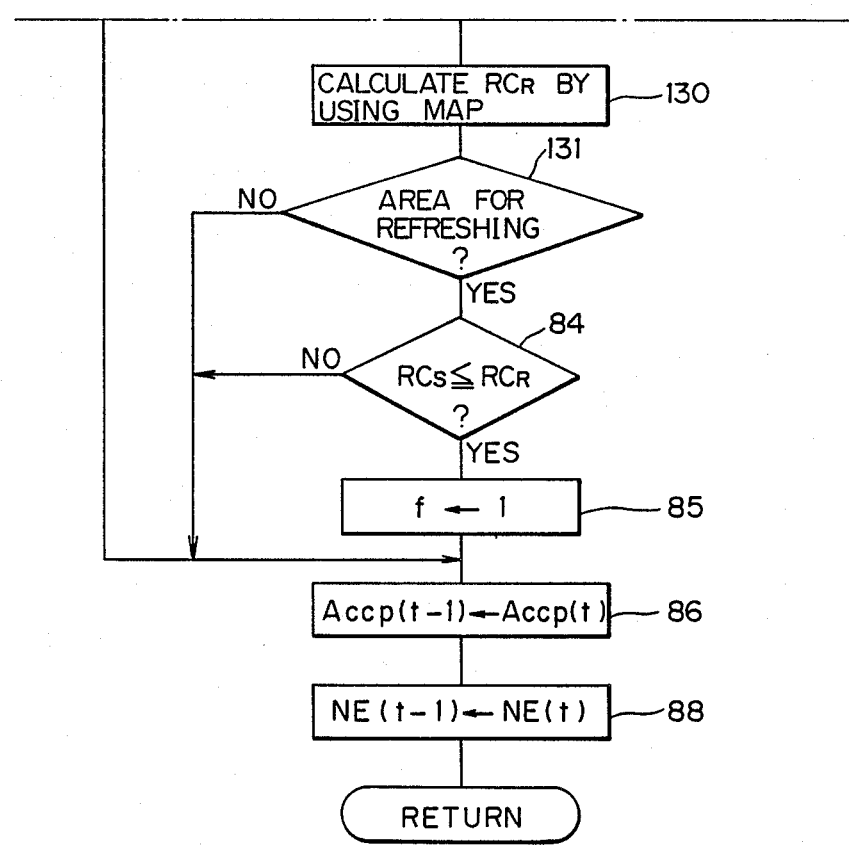
Figure 10:
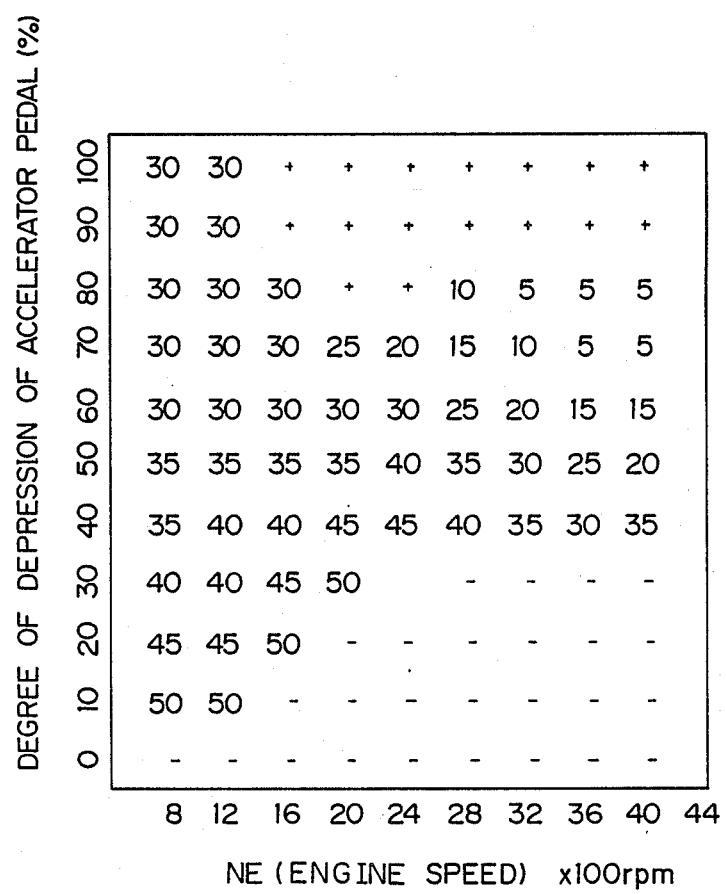

FIG. 9 is a flow chart of a refresh flag set routine. In comparison with FIG. 2, steps 80 and 82 are replaced by steps 130 and 131. The other steps are substantially the same as that in FIG. 2. Thus, only these new points will be explained. At point 130, the threshold value $RC_R$ of the trapping ratio $RC_S$ for commencing the refresh operation of the filter is calculated from the map stored in the memory 50. FIG. 10 shows an example of this map, which is constructed by an array comprising the engine speed and the degree of depression of the accelerator pedal. At each of the points defined by a combination of the values of the engine speed and the degree of depression of the accelerator pedal, a threshold value $RC_R$ of the trapping ratio $RC_S$ is stored. In this map of FIG. 10, points designated "+" correspond to areas where the refresh of the filter is automatically executed due to the high temperature of the exhaust gas, and points designated "−" correspond to areas where the engine is in a condition where a small amount of fuel is injected, or in a fuel cut condition. At the areas determined by engine speed and the degree of depression of the accelerator pedal, other than the areas designated "+" and "−", threshold values $RC_R$ of the trapping ratio $RC_S$ for commencing the refresh operation of the filter are stored. A known interpolation method is carried out to obtain a threshold value $RC_R$ of the trapping ratio $RC_S$ corresponding to the prevailing engine speed and the degree of depression of accelerator pedal as detected by the sensors 60 and 58, respectively.

At point 131 of FIG. 9, it is determined whether the engine speed and load are in an area designated "+" or "−" in FIG. 10. When the result is "YES" at point 131, steps 84 and 85 are by-passed. When the engine speed and load are in an area other than "+" and "−", the routine goes to point 84 to determine whether the time has come to carry out the refresh operation, by comparing the threshold value $RC_R$ of the trapping ratio $RC_S$ as calculated at point 130 and the actual value of the trapping ratio $RC_S$ calculated at point 80.

The third embodiment is advantageous from the point of view that a more precise determination of the timing for commencing the refresh operation of the filter is realized.

Although the embodiments of the present invention have been described with reference to the attached drawings, many modifications and changes can be made by those skilled in this art without departing from the scope and spirit of the present invention.

What is claimed:

1. A system for purifying particulates in exhaust gas for a diesel engine having an exhaust line for discharging the exhaust gas, said system comprising:
    filter means arranged in said exhaust line for trapping particulates in the exhaust gas by adsorption
    sensor means for detecting a trapping ratio of the particulates in the exhaust gas at the filter means, the sensor means comprising a first means for detecting a smoke density of the exhaust gas at a position upstream of the filter means, a second means for detecting a smoke density of the exhaust gas at a position downstream of the filter means, and a means for calculating a trapping ratio from the smoke density values sensed at the positions upstream and downstream of the filter;
    means for detecting a timing for a refresh operation of the filter means from the detected trapping ratio, and;
    means for executing the refresh operation when said timing is detected, so as to incinerate particulates held in the filter.

2. A system according to claim 1, wherein said first means comprises a smoke sensor arranged in the exhaust line at a position upstream of the filter means.

3. A system according to claim 1, wherein said first means comprises a means for storing data of a relationship between engine operating conditions and the smoke density at the position upstream of the filter, means for detecting actual engine operating conditions, and means for calculating, from the stored data, the smoke density at the position upstream of the filter corresponding to the actually sensed engine condition.

4. A system according to claim 1, wherein said timing detecting means comprises means for determining a threshold value of a trapping ratio for commencing the refresh operation of the filter and a comparator means for comparing the threshold value with the detected trapping ratio so as to determine the timing of the refresh operation.

5. A system according to claim 4, wherein said threshold value determining means comprises means for storing data of a relationship between the threshold value and engine operating conditions, means for detecting engine operating conditions, and means for calculating, from the stored data, a threshold value corresponding to the detected operating conditions.

6. A system according to claim 1, further comprising means for detecting a transient condition of the engine and means for preventing a refresh operation when the engine is in the transient state.

7. A system according to claim 1, wherein the pressure difference across said filter means does not always correspond to the amount of trapped particulates.

* * * * *